UNITED STATES PATENT OFFICE.

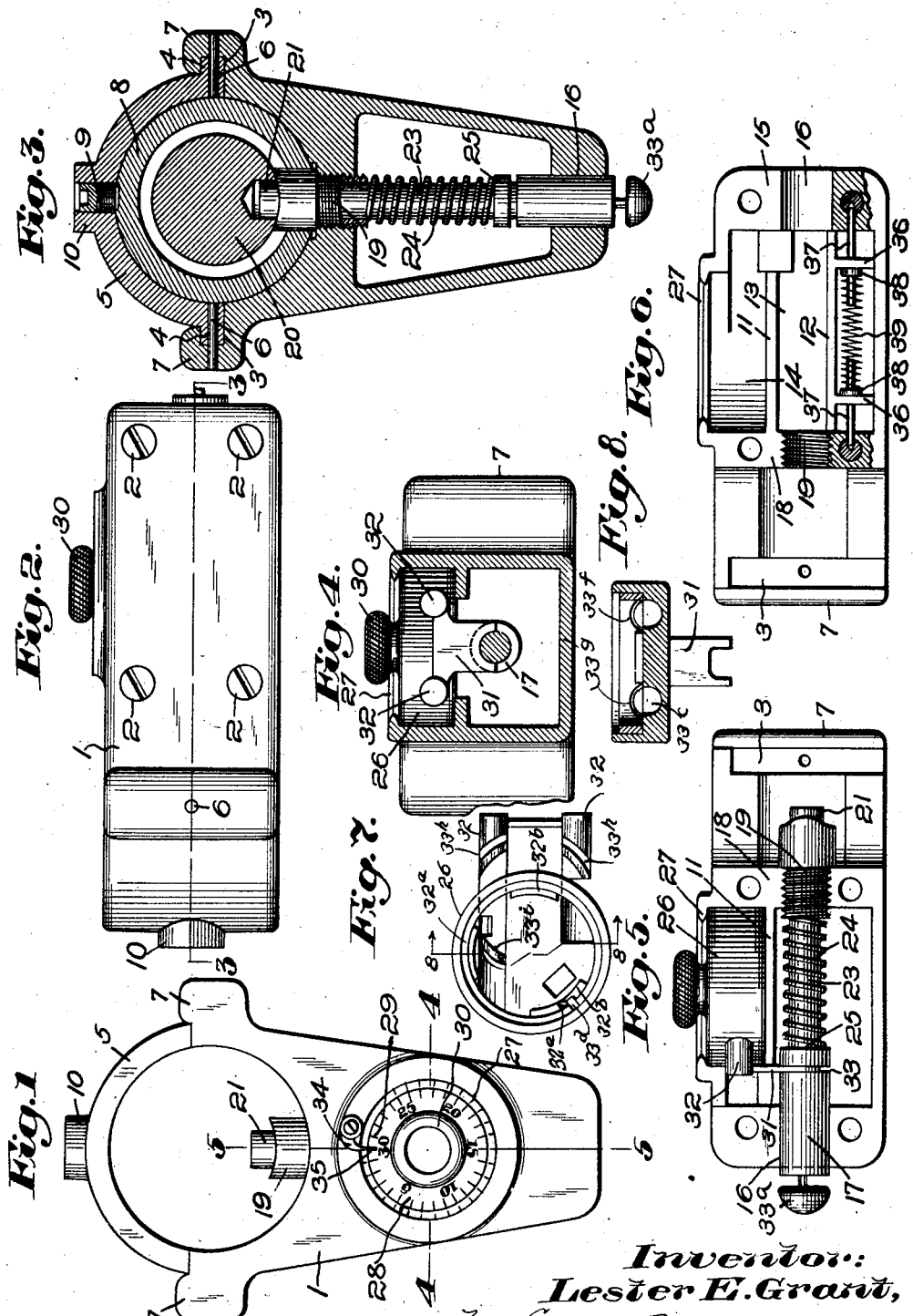

LESTER E. GRANT, OF AUBURNDALE, MASSACHUSETTS.

VEHICLE-LOCK.

1,391,105.     Specification of Letters Patent.     Patented Sept. 20, 1921.

Application filed April 15, 1920. Serial No. 374,001.

*To all whom it may concern:*

Be it known that I, LESTER E. GRANT, a citizen of the United States, and resident of Auburndale, county of Middlesex, and Commonwealth of Massachusetts, have invented an Improvement in Vehicle-Locks, of which the following description, in connection with the accompanying drawings, is a specification, like characters on the drawings representing like parts.

This invention relates to locking means for vehicles and is particularly adapted for automobiles. It is designed to prevent theft or unauthorized use of such vehicles.

In the drawings of the particular embodiment of my invention selected for illustration and description herein:

Figure 1 is a plan;

Fig. 2, a side elevation;

Fig. 3, a longitudinal section on the line 3—3, Fig. 2;

Fig. 4, a vertical cross-section on the line 4—4, Fig. 1;

Fig. 5, a side elevation of one casing member on the line 5—5 Fig. 1, looking toward the left;

Fig. 6, a similar view looking toward the right.

Fig. 7, a plan of the lock with the dial member removed; and Fig. 8, a vertical section from the left on the line 8—8, Fig. 7.

The present embodiment of my invention comprises a housing or casing 1 of suitable material as metal, and is here shown in Figs. 1, 5, 6, as comprising two half sections secured by any convenient casing section securing means as by screws 2.

The two halves are, Figs. 3, 5, 6, at their upper or forward ends provided with vertical slots 3, to receive the flanges 4, 4, Fig. 3, on the ends of the segmental steering column band 5, which extends half way around the steering column Fig. 3, and are secured to the column band by pins 6, 6, driven through the flanges 7, 7 of the sections. This band 5 may be locked to the steering column 8 in any suitable manner, as by a headless screw 9 threaded into a boss 10 on the band, and caused to impinge on the steering column.

I will now describe my novel locking mechanism. The casing, Figs. 5, 6, is provided with horizontal webs 11, 12, forming a bolt chamber 13 and lock chamber 14. The rear wall 15 is drilled to provide a bolt passage 16 for the rear bolt end 17, and the front wall 18 is drilled and threaded to receive a threaded bushing 19 which, Figs. 1 and 3, is adapted to extend through the column 8 and contact with the surface of the steering post 20.

Through this bushing, Figs. 3 and 5, extends the locking end 21 of the bolt and resting in an aperture in the post, when in locking position. The bushing being adjustable in the wall 18 may be adjusted to fit the particular steering column in use. The bushing serves to act as a guide for the bolt and thus acts to prevent binding or jamming of the bolt by the post.

The bolt, Fig. 5, is reduced in diameter at its central portion 23 and carries a coil spring 24, the rear end being seated against the shoulder 25, formed by the enlarged rear end of the bolt while the forward end of the spring is seated against the rear end of the bushing. The spring thus acts normally to withdraw the bolt 24 from engagement with the steering post.

For retaining this bolt in locking position against the action of the spring 24, Fig. 5, I provide a novel construction comprising a permutation or combination lock thus avoiding the necessity for carrying a key. This lock is inclosed in a case 26 which fits closely in the chamber 14 formed between the web 11 and the top of the casing 27.

The interior of the lock 26 as to the bolt securing and releasing details *per se* form no part of this invention and may be of any preferred construction. Controlling these elements Fig. 1, is the dial or disk 28 with registering marks 29 around its edge and the disk may be turned by the knob 30 to cause the numbers or marks thereon to register with the proper number or mark in the scale 27 on the edge of the casing, said scale marks being depressed into the edge of the casing.

For connecting the combination elements or disks of the lock however, with the bolt Fig. 4, is a novel bolt controlling and actuating yoke member 31 its opposite ends connected to the two bars 32, the inner ends of which are within the case 26 and engaged by one of the combination members. The curved lower outer end of the yoke 31 engages the bolt end 17 by means of a channel 33 thereabout.

The combination member referred to is shown herein as a ring $32^a$ which is held in position by three upstanding lugs $32^b$ on the bottom $33^c$ of the casing. This ring is rotated by the contact with the lug 33$^d$ of a lug 33$^e$ not shown, on the edge of the dial 28 and normally beneath the inturned edge 27 of the casing, and therefore not ordinarily seen.

The lower edge of the ring 32$^a$ has two slots 33$^f$, 33$^g$, see Fig. 8, on its lower edge. These slots are high enough to permit the bars 32 to slide thereunder when the slots register with the bolt ends. The lower edge of the ring normally rests in the slots 33$^h$ in the bars 32, see Fig. 7, when they are in locking position.

When, however, by the turning of the dial, the ring 32$^a$ has been rotated by the lug 33$^e$ on the edge of the dial, contacting with the lug 33$^d$ on the ring, so that the two slots 33$^f$, 33$^g$, in the ring register with the ends of the bars 32, then the bars may be withdrawn until the lug 33$^i$ on one bar contacts with the inner wall of the ring 32$^a$, to prevent further withdrawal of the same, the lug 33$^i$ in Fig. 7, being shown midway between its path of travel across the body of the casing.

By this arrangement the bolt 23 is rotatable in its bearings which is a distinct advantage. When a car has been left locked and standing for a few weeks as in a garage, sometimes dust and dirt will collect about the bolt and acting as a wedge will prevent or make difficult the throwing of the bolt. By turning the bolt in its bearings, by means of the knob 33$^a$, it will be freed from the dust and may then be withdrawn readily.

Obviously when the bars are released by the turning of the knob 30 to the proper numbers of the combination, the spring 24 will withdraw the bolt 23 from its engagement with the post 20, and permit free rotary movement of the latter.

When the post is to be locked it is turned until the aperture therein registers with the bolt 21, when the latter may be thrust into the aperture by means of the knob on the end of the section 17 and locked by the turning of the knob 30.

The knob 33$^a$ has but a slender connection or neck with the bolt end 17 so that if any unauthorized person attempts to manipulate the bolt improperly, as by pulling it sharply rearwardly to break its yoke 31 the knob will break off.

To enable one to conveniently operate the lock in the dark I have provided novel audible dial registering means including a pointer 34 which is mounted upon the flange 27 of the casing and the point 35 of which is extended inwardly over the disk or dial 28 and rests thereon dropping into the depressions 27 on the edge of the casing.

The zero mark 30 on the dial is made a little wider than the others so that when the pointer rests thereon it will be allowed some play if moved therein.

In this way the zero mark may be readily recognized in the dark. When the pointer engages the other marks, however, it makes a distinct clicking sound and thus one may, by counting the clicks, determine exactly how far he turns the dial in each direction and readily pick out the proper combination to unlock the bolt.

Obviously the pointer may be positioned anywhere on the flange and any number on the dial may be selected as the zero mark.

For locking the two casing halves securely I provide casing member securing means for preventing the removal of one or more of the screws 2. In the present case I provide two cross ribs 36 extended downwardly from the rib 12 and drill them and the rear and forward walls 15 and 18 respectively to the holes for the screws 2. In these apertures I provide screw locking pins 37 having flanges 38 against which are seated the opposite ends of a coil spring 39 which thus acts to retain the pins in inward position. These pins will yield to permit screws 2 to be turned up until apertures in the sides of the screws register with the beveled ends of the pins 37, which are thus permitted to enter the screws and lock them against withdrawal from the casing. When access is desired to the interior of the lock, the casing securing screws may be drilled out, thus separating the two halves of the casing.

From the foregoing it will be observed that I have provided an exceedingly simple construction wherein the casing consists of only two sections which are vertically separable to disclose all parts of the interior construction for readily repairing the same should it be necessary. The lock chamber, bolt chamber and casing securing means locking members are superimposed one above the other and readily accessible for any purpose. The bolt bushing 19 is also readily accessible for adjustment to fit the steering column on which it is to be used. I know of no other lock of this nature which is so simple in construction and all parts of which are so readily accessible as in the present case.

My invention is not limited to the construction shown and described, in all its details, and I claim:

1. A lock for motor vehicles comprising a multi-part casing having a lock chamber, an opening in the wall thereof to display the face of the lock, lock retaining means, a bolt chamber, a bolt therein controlled by the lock in the adjoining chamber, a bushing on the bolt extended through the steering column, casing member securing means for securing the casing sections together, and means for anchoring the casing member securing means to prevent removal thereof and destruction of the lock.

2. A lock for motor vehicles comprising a multi-part casing having a lock chamber, an opening in the wall thereof to display the face of the lock, a flange on the edge of the opening to retain the lock in the chamber, a bolt chamber, a bolt therein controlled by the lock in the adjoining chamber, a bushing on the bolt extended through the steering column, casing member securing means to lock the casing parts together, and means for anchoring the casing member securing means to prevent removal thereof and destruction of the lock comprising pins and a spring to cause the pins to engage the casing member securing means.

3. A casing for an automobile lock comprising a plurality of vertically separable sections, securing means therefor, anchoring means for the securing means, a lock chamber, a bolt chamber and a chamber for anchoring means for the section securing means superimposed one over the other, and adapted to be rendered accessible by a vertical separation of the section parts.

4. A casing for an automobile lock comprising a plurality of hollow sections 7, 7, a steering column band 5 adapted to connect the same and secure them to the steering column, casing securing screws 2, upright ribs 36 in one section, locking pins 37 slidable therein and into the securing screws, spring 39 acting normally to retain said locking pins in said screws, a lock chamber 14 in the case, an opening through the top thereof, a lock 26 therein, a bolt chamber 13 beneath the lock chamber, a bolt therein and extending therethrough adapted to engage the steering post, a yoke 31 depending from the lock and engaging the bolt, and the spring 24 acting normally to keep the bolt in extended position.

5. A lock casing or housing comprising a multi part shell having a lock chamber, a bolt chamber beneath it and communicating therewith, bearings for the bolt in both ends of the bolt chamber, casing member securing means, anchoring means for the securing means to prevent withdrawal of the same, and a band for holding the casing to the steering column, said band having flanges adapted to be secured by the ends of the casing members.

6. A casing 1, band 5, the casing ends having slots 3 to receive the flanged ends of the band, lock chamber 14, bolt chamber 13, bearings 16 and adjustable bearing 19 for the bolt, spring 24 to actuate the bolt, screw locking pins 37, and spring 39 thereon acting to hold them in extended position to engage the casing securing members.

In testimony whereof, I have signed my name to this specification.

LESTER E. GRANT.